(12) United States Patent
Horst et al.

(10) Patent No.: US 11,375,668 B2
(45) Date of Patent: Jul. 5, 2022

(54) COMBINE HARVESTER TAILINGS RETURN SYSTEM

(71) Applicants: AGCO DO BRASIL SA LTDA, Ribeireo Preto (BR); AGCO International GmbH, Neuhausen (CH)

(72) Inventors: Walter Henrique Horst, Canoas (BR); Thomas Revsbeck, Randers (DK)

(73) Assignee: AGCO DO BRASIL SA LTDA, Ribeireo Preto (BR)

( * ) Notice: Subject to any disclaimer, the term of this patent is extended or adjusted under 35 U.S.C. 154(b) by 310 days.

(21) Appl. No.: 16/744,726

(22) Filed: Jan. 16, 2020

(65) Prior Publication Data
US 2020/0229350 A1 Jul. 23, 2020

(30) Foreign Application Priority Data
Jan. 17, 2019 (GB) ..................................... 1900681

(51) Int. Cl.
*A01F 12/46* (2006.01)
*A01D 41/12* (2006.01)
*B65G 67/24* (2006.01)
*B65G 33/32* (2006.01)

(52) U.S. Cl.
CPC .......... *A01F 12/46* (2013.01); *A01D 41/1217* (2013.01); *B65G 33/32* (2013.01); *B65G 67/24* (2013.01)

(58) Field of Classification Search
CPC ..... A01F 12/46; A01F 12/52; A01D 41/1217; B65G 33/32; B65G 67/24
See application file for complete search history.

(56) References Cited

U.S. PATENT DOCUMENTS

| | | | | |
|---|---|---|---|---|
| 2,875,768 | A | * | 3/1959 | Hockey .................. A01F 12/52 460/14 |
| 3,241,657 | A | * | 3/1966 | Buschbom ............ B65G 33/00 198/550.6 |
| 3,638,812 | A | * | 2/1972 | Ryczek ............... A01D 41/1217 414/523 |
| 3,669,125 | A | * | 6/1972 | Rowland-Hill ......... A01F 12/52 460/13 |
| 3,670,913 | A | * | 6/1972 | Reaves ............. A01D 41/1217 414/505 |
| 4,037,745 | A | * | 7/1977 | Hengen .............. A01D 41/1217 414/504 |

(Continued)

FOREIGN PATENT DOCUMENTS

| | | | | |
|---|---|---|---|---|
| CN | 102291980 A | * | 12/2011 | ............. A01F 12/52 |
| EP | 1038429 A1 | * | 9/2000 | ............. A01F 12/52 |

(Continued)

OTHER PUBLICATIONS

UK Intellectual Property Office, Search Report for priority UK Application No. GB 1900681.6, dated Jul. 1, 2019.

*Primary Examiner* — Arpad Fabian-Kovacs (57) ABSTRACT

A tailings return system for use in a combine harvester includes a tailings conveyor having an upper part and a lower part. The upper part is hingedly connected to the lower part, allowing the upper part to be folded back against the lower part to create an open space in the combine harvester, facilitating access to other components within the combine harvester.

16 Claims, 6 Drawing Sheets

(56) References Cited

U.S. PATENT DOCUMENTS

| | | | | |
|---|---|---|---|---|
| 4,292,981 | A * | 10/1981 | De Busscher | A01F 12/18 460/14 |
| 4,470,420 | A * | 9/1984 | Hanaway | A01F 12/52 460/11 |
| 5,100,281 | A * | 3/1992 | Grieshop | B60P 1/40 414/526 |
| 6,422,376 | B1 * | 7/2002 | Nichols | B65G 33/32 198/632 |
| 7,367,881 | B2 * | 5/2008 | Voss | A01D 41/1217 414/526 |
| 8,033,377 | B2 * | 10/2011 | Reimer | B65G 33/32 198/313 |
| 8,696,292 | B2 * | 4/2014 | Dulong | A01F 12/46 414/310 |
| 10,518,980 | B2 * | 12/2019 | Gerdeman | B65G 33/14 |
| 11,019,767 | B2 * | 6/2021 | Banks, Jr. | A01D 41/1217 |
| 2014/0106831 | A1 | 4/2014 | Wilde Van Wildemann | |
| 2015/0237804 | A1 * | 8/2015 | Van Mill | B60P 1/42 414/523 |
| 2015/0296709 | A1 * | 10/2015 | Patterson | B65G 33/32 414/468 |
| 2016/0319857 | A1 * | 11/2016 | Patterson | F16D 1/06 |
| 2017/0099777 | A1 * | 4/2017 | Weeks | A01D 41/1243 |
| 2019/0274254 | A1 * | 9/2019 | Banks, Jr. | A01F 12/52 |

FOREIGN PATENT DOCUMENTS

| | | | | |
|---|---|---|---|---|
| EP | 1516522 | A2 * | 3/2005 | A01D 41/1276 |
| EP | 2702861 | A1 * | 3/2014 | A01D 41/1217 |
| EP | 2719271 | A1 * | 4/2014 | A01F 7/00 |
| GB | 2051542 | A * | 1/1981 | A01F 12/442 |
| JP | 2002305957 | A | 10/2002 | |
| JP | 2003304727 | S | 10/2003 | |
| JP | 2007244234 | A | 9/2007 | |
| JP | 2009219448 | A | 10/2009 | |

* cited by examiner

COMBINE HARVESTER TAILINGS RETURN SYSTEM

CROSS-REFERENCE TO RELATED APPLICATION

This application claims the benefit of the filing date of U.K. Patent Application GB 1900681.6, "Combine Harvester Tailings Return System," filed Jan. 17, 2019, the entire disclosure of which is incorporated herein by reference.

BACKGROUND

Field

The present disclosure relates to combine harvesters and particularly to tailings return systems used therein, wherein the tailings return system serves to collect tailings screened out from a crop material stream by a grain cleaning system, and return the tailings to a location in the combine harvester upstream of the grain cleaning system for reprocessing.

Description of Related Art

It is known to provide a tailings return system in a combine harvester in which the tailings return system comprises a rigid tailings conveyor extending from a tailings collection channel at a lower end to a tailings ejection channel at an upper end where the tailings may be returned to the combine harvester for further processing. The tailings conveyor is mounted at a side of the combine harvester and once in position, inhibits access to other components, such as the rotors, within the combine harvester for effecting maintenance or repair of such other components. In order to effect such maintenance or repair, the tailings conveyor needs to be disconnected from the combine harvester, itself a skilled and time-consuming activity.

BRIEF SUMMARY

A tailings return system has a tailings conveyor for use in a combine harvester that includes an upper part and a lower part, the upper part being hingedly connected to the lower part.

This has as an advantage that the upper part of the tailings conveyor may be folded back against the lower part of the tailings conveyor to create an open space in the combine to enable access to other components, such as the rotors within the combine harvester, for maintenance or repair of such other components.

Each part of the tailings conveyor may include a conveyance channel in which a drive shaft is adapted to rotate a screw conveyor.

The upper part and the lower part may be releasably secured in an aligned position. The upper part and the lower part may each have an abutment means.

The abutment means for each of the upper and lower parts may be a radially extending flange. Alternatively, the abutment means for one of the upper and lower parts may be a circumferential groove and the abutment means for another of the upper and lower parts may be a peripheral tongue adapted to be seated within the circumferential groove.

The drive shaft in one of the upper and lower parts may include a male fitting and the drive shaft in the other of the upper and lower parts may include a female fitting.

The male fitting may include a frustoconical portion for seating within the female fitting. One of the male and female fitting may include a radial projection and the other of the male and female fitting may have an abutment surface.

In some embodiments, the male fitting may include an adjustable cap for seating against the female fitting. The cap may be adapted for axial movement with respect to the drive shaft. The drive shaft may include a longitudinal member secured to the drive shaft. The cap may be mounted on the longitudinal member for axial displacement with respect to the longitudinal member.

The cap may have a plurality of abutment surfaces and the female fitting may have a plurality of abutment surfaces.

A biasing member may be disposed on the longitudinal member between the longitudinal member and the cap.

The upper part of the tailings conveyor may have an ejection channel with a peripheral flange.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

The present disclosure is described herein with respect to certain illustrated embodiments. Those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

Reference to terms such as longitudinal, transverse and vertical are made with respect to a longitudinal vehicle axis which is parallel to a normal forward direction of travel. The terms "upstream" and "downstream" are made with reference to the general direction of crop flow along the material conveyance systems described.

Figure 1:
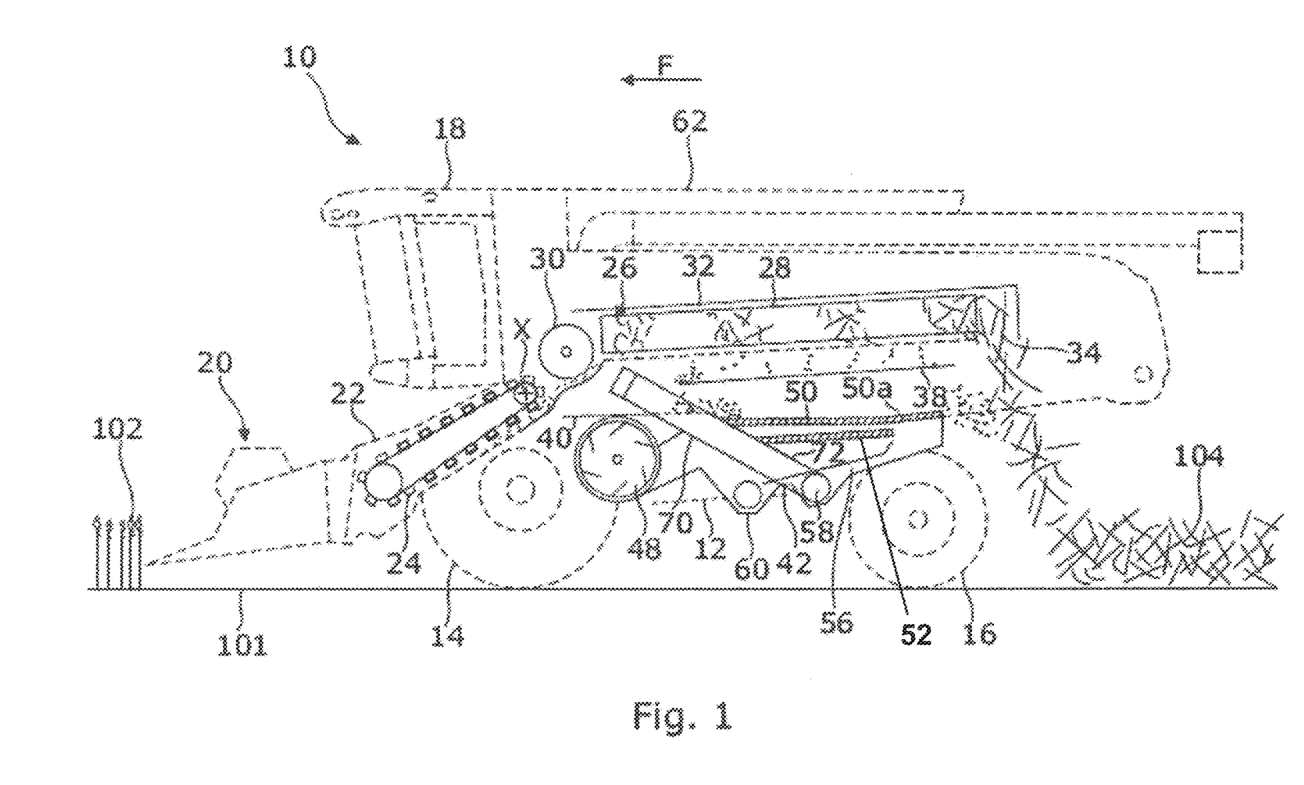
FIG. 1 shows a side view of a combine harvester revealing, in schematic form, a grain cleaning system and a tailings return system.

With reference to FIG. 1, the main components of a crop processing system of a combine harvester 10 are shown in schematic form and will be used to explain the flow of material below. The crop processing system is shown in solid lines, and the outline profile of harvester 10 is shown in ghost form.

Combine harvester 10, hereinafter referred to as 'combine', includes a frame 12 supported on front wheels 14 and rear steerable wheels 16 that engage the ground 101. A driver's cab 18 is also supported on the frame 12 and houses a driver's station from which a driver controls the combine 10.

A cutting header 20 is detachably supported on the front of a feederhouse 22 which is pivotable about a transverse axis X to lift and lower the header 20.

The combine 10 is driven in a forward direction (arrow F) across a field of standing crop 102 in a known manner. The header 20 serves to cut and gather the standing crop material before conveying such as a crop material stream into feederhouse 22. An elevator 24, normally in the form of a chain-and-slat elevator as shown, is housed within the feederhouse 22 and serves to convey the crop material stream upwardly and rearwardly from the header 20 to the crop processor designated generally at 26. At this stage, the crop material stream is unprocessed.

A threshing and separating apparatus 26 includes a pair of axial flow threshing and separating rotors 28 fed by a tangential flow, crop material impelling, feed beater 30.

The feed beater 30 rotates on a transverse axis and includes crop engaging vanes that convey the crop material stream under the beater and into rotor housings 32, which each house one of the rotors 28. It should be appreciated that only the left-hand rotor 28 and housing 32 is shown in FIG. 1, and the right-hand equivalent is hidden from view.

Axial flow rotors 20 serve to thresh the crop stream in a front region, separate the grain therefrom in a rear region, and eject the straw residue through an outlet 34 in the housing 32 at the rear of the machine either directly onto the ground in a windrow 104 as shown, or via a straw chopper.

A part-cylindrical grate provided in the underside of each rotor housing 32 allows the separated material to fall by gravity onto either a return pan 38 located below a rear section of the processor 26, or directly onto a preparation pan 40 located below a front section of the processor 26. In reality, the separated material falling through the grate is typically a mix of grain and material other than grain (MOG) which may include chaff, unthreshed seed head, and some straw.

The twin rotor axial flow processor 26 shown is one example of a system providing threshing and separating apparatus employed in combines. Other types of crop processors include single rotor axial flow processors, tangential flow/straw walker (or conventional) processors, and hybrid processors.

The return pan 38 and preparation pan 40 together serve as a material conveyance system arranged to convey the separated crop material to a grain cleaning shoe designated generally at 42.

The grain-MOG mix falls from the preparation pan 40 into the cleaning shoe 42 where the cascading mix is subjected to a cleaning airstream generated by a fan 48, before falling onto the front of upper sieve or chaffer 50.

The chaffer 50 may include adjustable louvres supported on a frame, which is driven in fore-and-aft oscillating manner. Material that settles on the chaffer 50 is conveyed in a generally rearward direction, and the heavier smaller grain-rich material passes between the louvres onto an underlying lower sieve 52, whereas the lighter larger material passes to the end of the chaffer 50 and out of the rear of the machine. A rear section of chaffer 50a is usually independently adjustable and is configurable to allow un-threshed seed heads to pass therethrough into a tailing collection channel 56.

The lower sieve 52 is also driven in an oscillating manner to convey the collected grain-MOG mix rearwardly, and the material falling therethrough is collected by a clean grain auger 60 for conveyance to an elevator for onward conveyance to a grain tank 62. Tailings that are screened out by the lower sieve 52 fall off the rear edge thereof and into the tailing collection channel 56.

A tailings return system 70 is provided to collect the tailings from the tailings collection channel 56 and convey, or 'return' the tailings to the preparation pan 40. The tailings return system 70 comprises a tailings collection auger 58 which resides in a trough at the base of the tailings collection channel 56, the auger 58 being operable to deliver the tailings to one side of the combine 10 (the right-hand side in the illustrated embodiment) and into an inlet of a tailings conveyor 72 which is external the right-hand side wall 12.

Figure 2:
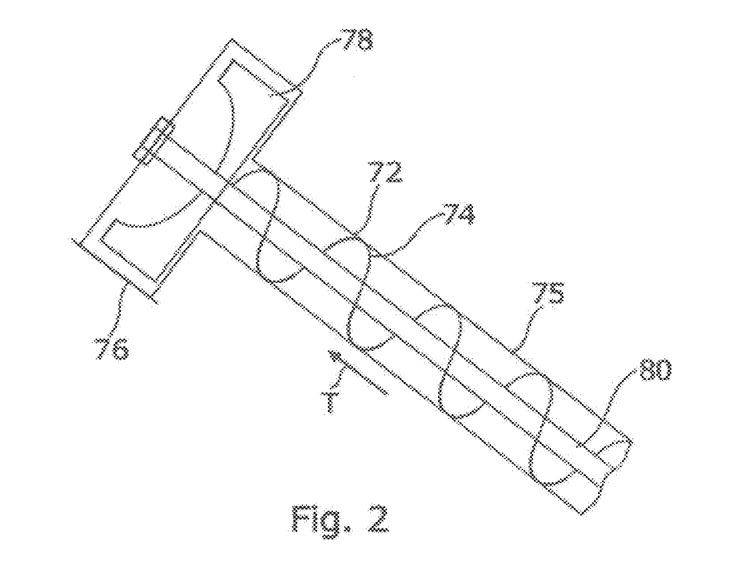
FIG. 2 shows a schematic vertical sectional view of part of the tailings return system shown in FIG. 1.

With reference to FIG. 2, the tailings conveyor 72 has a screw conveyor 74 located inside a tailings conveyance channel 75, the screw conveyor 74 being operable to convey the tailings from the collection auger 58 upwardly and forwardly (in the direction of arrow T) through the conveyance channel 75 into an impellor housing or drum 76 located at a downstream end of the conveyance channel 75.

An impellor 78 is housed within the impellor housing 76 and may include a pair of paddles mounted to a shaft 80, which shaft 80 may be common with the screw conveyor 74. The impellor 78 is operable to rotate and project a tailings stream toward and through an ejection channel 82 (See FIG. 3).

The tailings conveyor 72 is mounted externally of, and extends parallel to, a side wall, which can be considered as part of frame 12. Although the illustrated embodiment includes a screw conveyor, alternative conveyors can be employed. For example, the screw conveyor 74 can be replaced with a paddle-type.

Within the impellor housing 76 the paddles of the impellor 78 rotate with the shaft 80 and serve to propel the tailings stream tangentially from the impellor housing 76 into the ejection channel 82. The ejection channel 82 provides a conduit through an opening 84 provided in the side wall above the preparation pan 40. The tailings stream is projected onto the preparation pan 40, through the ejection channel 82, by the impellor 78.

Turning to FIGS. 3 through 9, elements of a two-part tailings return conveyor may be seen. Similar reference numerals are used to refer to similar parts.

As can best be seen in FIGS. 3 through 6, an upper part 72A of the tailings conveyor may be hingedly connected to a lower part 72B of the conveyance channel. The shaft of the tailings return system comprises a first upper portion 80A operating within the upper part 72A of the tailings conveyor and a second lower portion 80B operating within the lower part 72B of the tailings conveyor. When aligned, as in FIGS. 3 and 7, the upper and lower parts of the shaft 80A, 80B allow the tailings to be conveyed from the auger 58 to the ejection channel 82.

Figure 3:
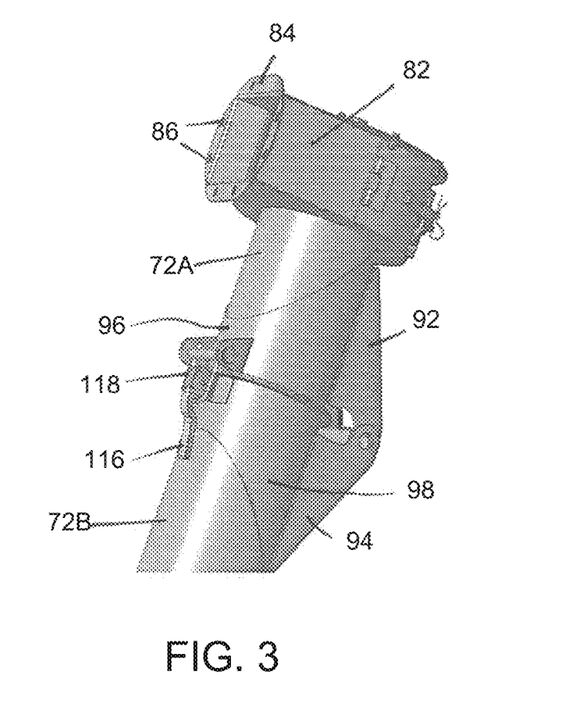
FIG. 3 shows an upper end of a tailings return system in accordance with the present disclosure.
Figure 4:
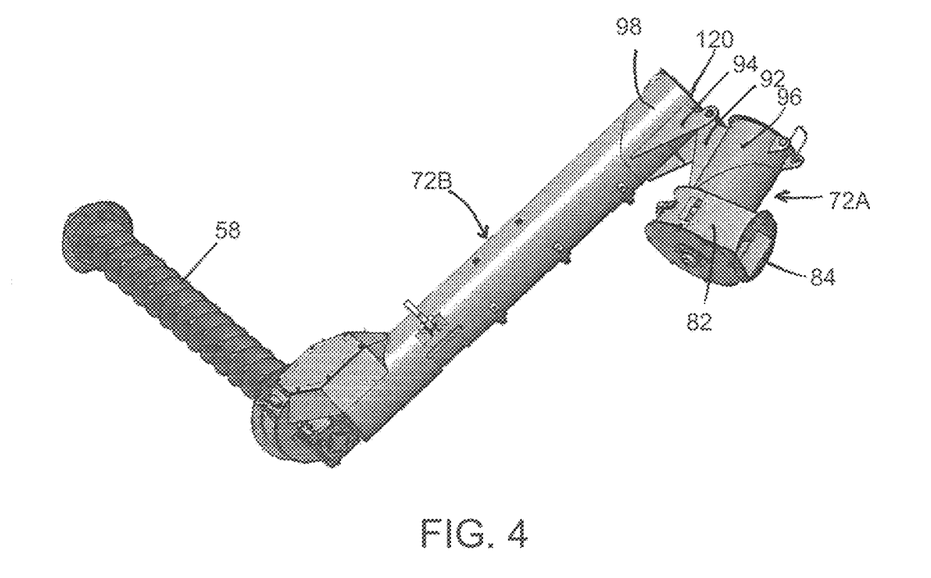
FIG. 4 shows a perspective view of elements of the tailings return system shown in FIG. 3 with the tailings conveyor in a folded condition.

As shown in FIG. 3, the ejection channel 82 may include with a peripheral flange 84, which may have a plurality of openings 86 through which fasteners may be used releasably to secure the peripheral flange 84 to the side wall 12 of the combine 10.

In the illustrated embodiment, the hinge includes a hinge pin arrangement 90 with a pivot axis about which the upper part 72A of the tailings conveyor may be moved with respect to the lower part 72B of the tailings conveyor. The upper part 72A of the tailings conveyor has first and second arms 92 connected to a first outer part of the hinge pin arrangement 90, and the lower part 72B of the tailings conveyor has first and second arms 94 connected to a second inner part of the hinge pin arrangement 90.

Each of the first and second arms 92, 94 are conveniently connected to a respective sleeve 96, 98 mounted to a respective end of the tailings conveyor. Each sleeve has a band encircling the respective tailings conveyor. Each band has a circumferential periphery adapted to pair with the circumferential periphery of the other.

In the embodiments of FIGS. 3 through 6, the upper and lower sleeves 96, 98 include radially extended circumferential flanges 105, 107 which abut one another when the upper and lower parts 72A, 72B of the tailings conveyor are aligned.

Figure 7:
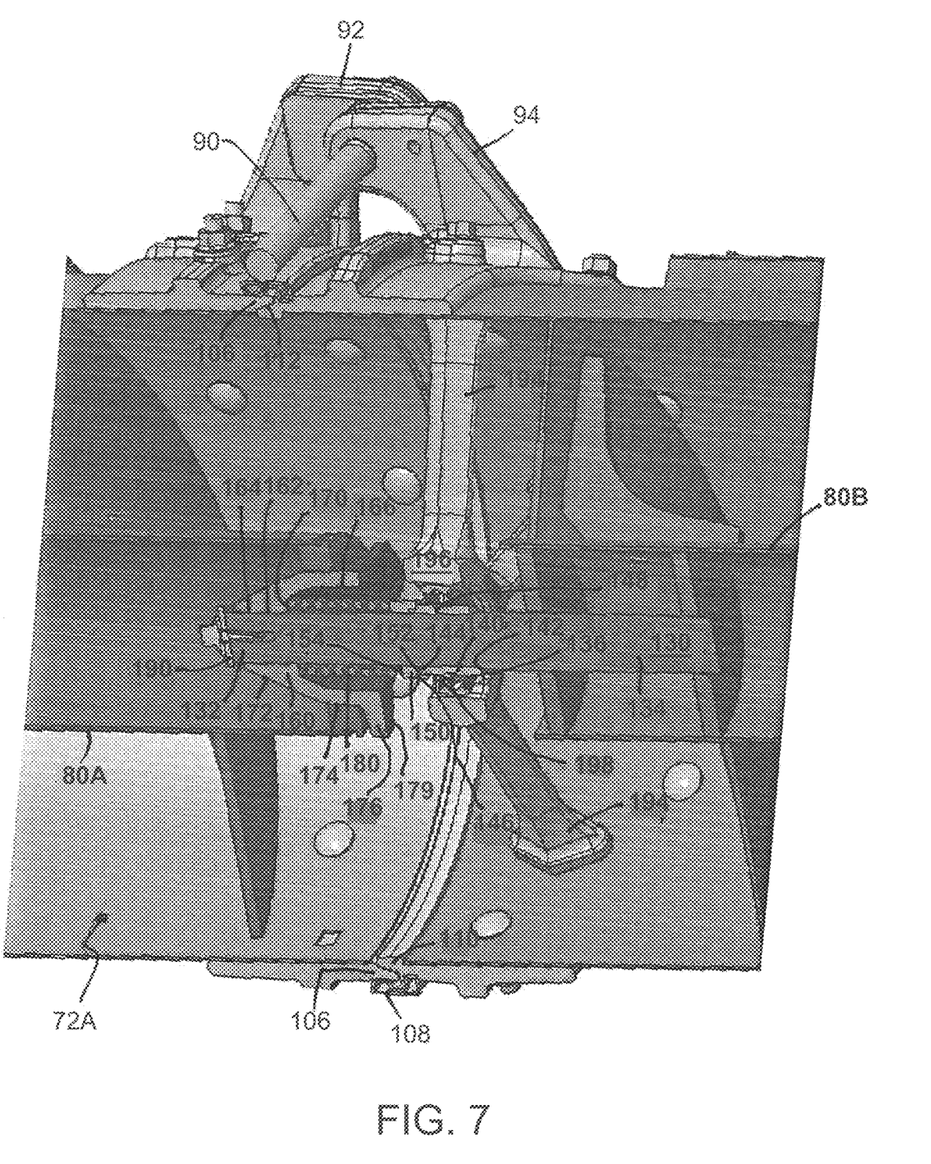
FIG. 7 shows sectional view of the upper end of a tailings conveyor for use in another embodiment of the present disclosure with the tailings conveyor in an unfolded condition.

In the embodiment of FIG. 7, the lower sleeve 96 has a peripheral tongue 106 extending beyond the edge of the lower part of the tailings conveyor 72B and the upper sleeve 98 has a radially outer peripheral longitudinally extending lip 108 and a radially inner peripheral longitudinally extending lip 110, such that a circumferential groove 112 is formed between them. The radially outer peripheral longitudinally extending lip 108 and the radially inner peripheral longitudinally extending lip 110 may be formed in any suitable fashion from any suitable material, for example the outer peripheral longitudinally extending lip 110 may be formed of a flexible material connected to the outer surface of the upper sleeve 98.

When the upper and lower parts of the tailings conveyor 72A, 72B are aligned, the peripheral tongue 106 is seated within the circumferential groove 112.

In an alternative embodiment, the peripheral tongue may be formed on the upper sleeve and the circumferential groove on the lower sleeve.

Any suitable securing mechanism may be used to keep the upper and lower parts of the tailings conveyor aligned. In FIGS. 3 through 6, a bail-style clasp is shown. One of the upper and lower sleeves 96, 98 may have a pivotally mounted hoop 114, the other may have a suitably shaped tether 116 pivotally mounted to a fixed tether mounting 118. The tether 116 passes through the hoop 114 and is pivoted back parallel to a longitudinal axis of the tailings conveyor to secure the hoop 114 between the tether 116 and the tether mounting 118.

One of the upper and lower parts 80A, 80B of the shaft, here the lower part 80B, may have a free end with a male fitting 120, while the other, here the upper part 80A, may have a corresponding female fitting 122.

Figure 5:
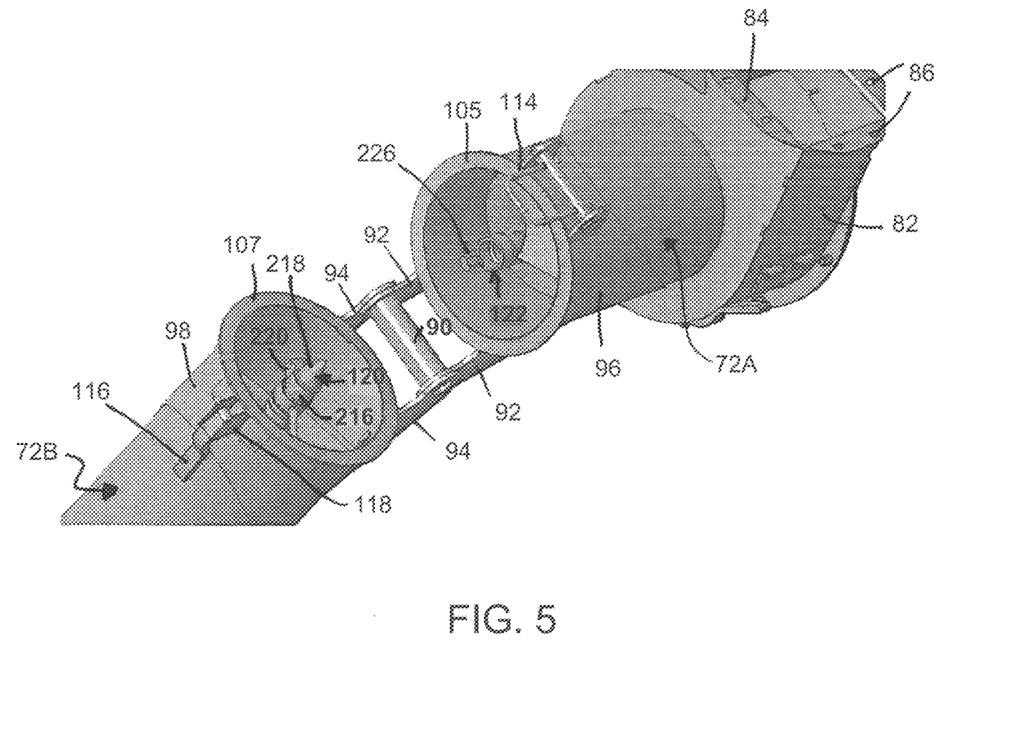
FIG. 5 shows a first perspective view of an upper end of a first embodiment of a tailings conveyor for use in the present disclosure.
Figure 6:
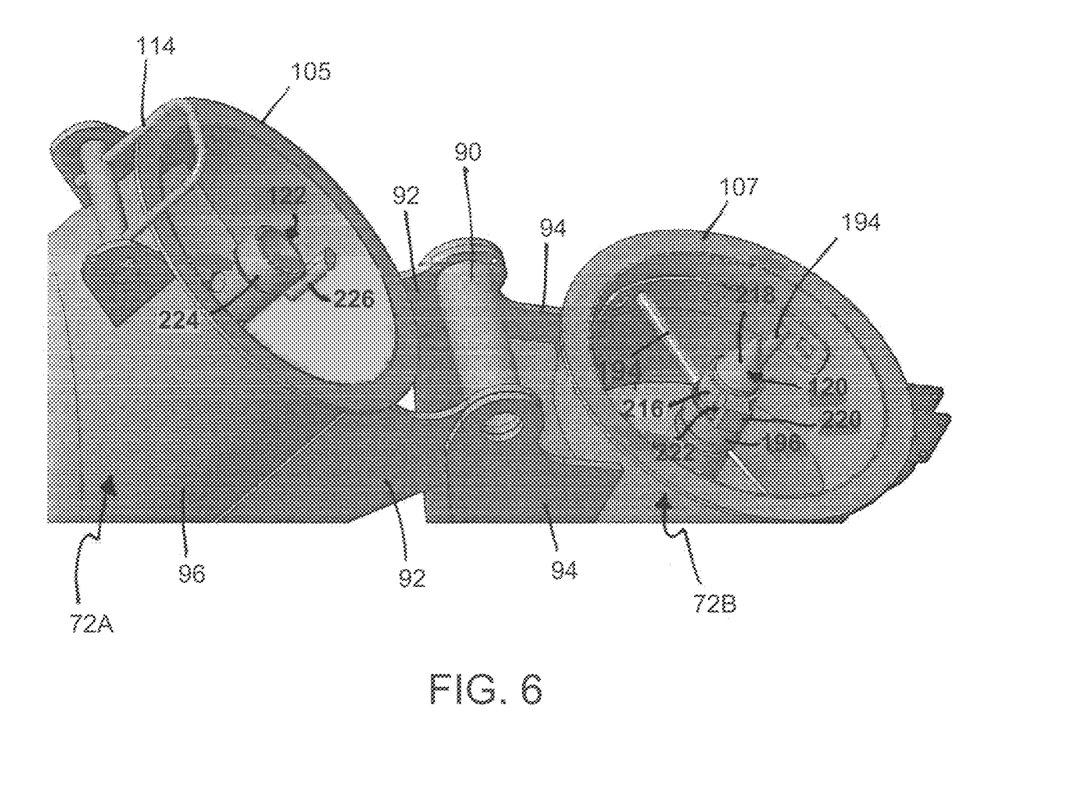
FIG. 6 shows a second perspective view of an upper end of a tailings conveyance channel shown in FIG. 5.

An embodiment of a suitable male and female fitting is shown in FIGS. 5 and 6.

The male fitting 120 includes a fitting secured to the lower drive shaft 80B. The fitting 120 has a first generally cylindrical part 216 to be fixed at one end to the lower drive shaft 80B and a generally frustoconical portion 218 at the other end. The first generally cylindrical part 216 has a radially extending projection, dog, or tooth 220. The radially extending projection 220 is conveniently formed integrally with the first generally cylindrical part 216. The radially extending projection 220 may be of any suitable shape and includes a receiving surface 222.

The female fitting 122 may have a generally tubular part 224 securely attached to the upper drive shaft 80A. The generally tubular part 224 has a longitudinally extending member 226 connected to a peripheral part of the generally tubular part 224. The longitudinally extending member 226 extends longitudinally beyond a free edge of the generally tubular part 224.

When the upper tailings conveyor 72A is moved from the folded position, the male fitting 120 and the female fitting 122 are brought together. It will be understood that the frustoconical portion 218 may be seated within the tubular part 224 of the female fitting. In use, as the driven part of the shaft rotates, the projection 220 of the male fitting is rotated until it abuts the longitudinally extending member 226 of the female fitting 122. Further rotation of the driven part of the shaft then causes the upper and lower parts 80A, 80B of the shaft to rotate together as one.

Conveniently, the longitudinally extending member 226 may be shaped to mate with the receiving surface 222 of the projection 220. Any suitable shape may be employed for the projection 220 for engagement with any suitably shaped longitudinally extending member 226.

Figure 8:
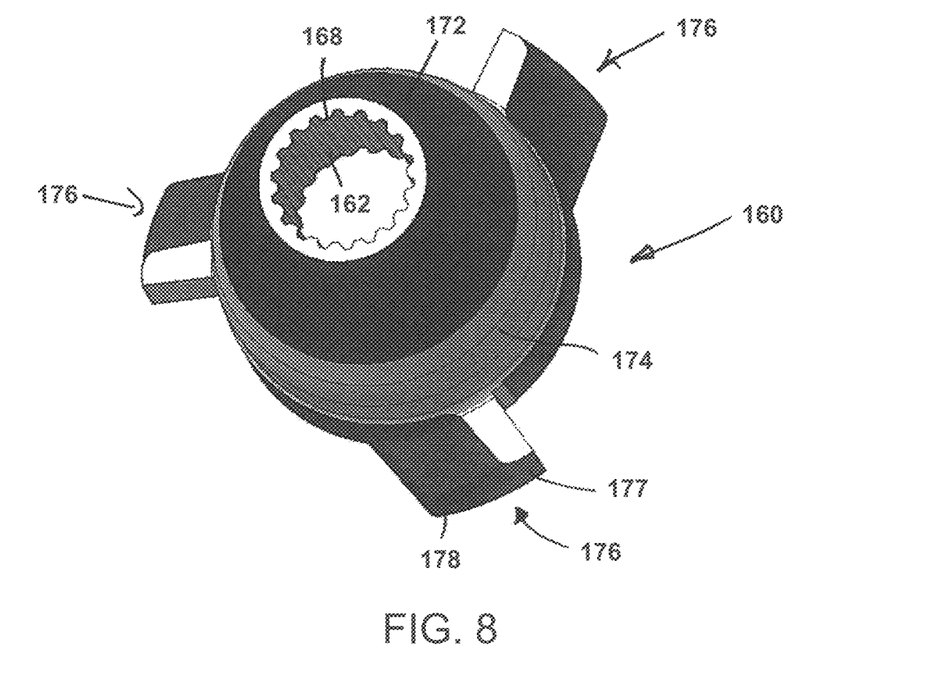
FIG. 8 shows a perspective view of part of a male fitting shown in FIG. 8.
Figure 9:
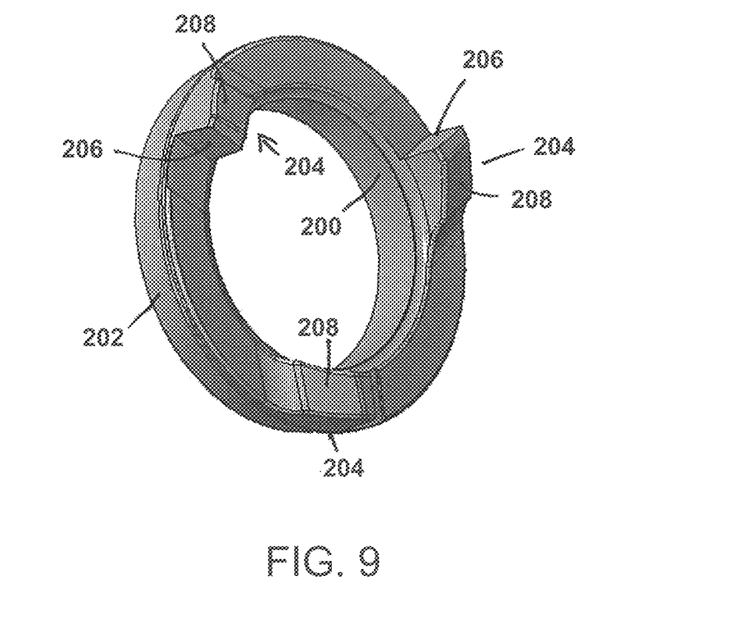
FIG. 9 shows a perspective view of part of a female fitting shown in FIG. 8.

A second embodiment of a suitable male and female fitting is shown in FIGS. 7, 8, and 9.

The male fitting 120 may include a longitudinal member 130 secured to a free end of the lower drive shaft 80B and aligned with the longitudinal axis thereof. The longitudinal member 130 extends beyond the free end of the lower drive shaft 80B. The longitudinal member 130 may include a first part 132 having a first diameter and a second part 134 having a second diameter secured to the free end of the lower drive shaft 80B with a shoulder 136 formed between the first and second parts 132, 134. The second part 134 may include at least one longitudinally extending spline. A first sleeve 140 (to be described further) is mounted on the first part 132 of the longitudinal member 130 and abuts the shoulder 136 along a first peripheral edge 142. A second peripheral edge 144 of the first sleeve 140 abuts a first peripheral edge 152 of a second sleeve 150, the second sleeve 150 also being mounted on the longitudinal member 130. In the illustrated embodiment, the second peripheral edge 144 of the first sleeve is of narrower diameter than the rest of the first sleeve to form a first sleeve shoulder 146. The first peripheral edge 152 of the second sleeve 150 is provided with a matching recess such that the second sleeve 150 is seated on the first sleeve 140. A second peripheral edge 154 of the second sleeve 150 provides an abutment surface.

The elongated member 130 may have a cap 160 of broadly frustoconical configuration and having a central bore 162. The central bore 162 has a first portion 164 of constant diameter, provided with splines 168 (FIG. 8) to match that or those of the longitudinal member 130. The first portion 164 terminates within the cap 160 with a radially extending abutment surface 170. The bore 160 then tapers outwards to a second portion 166 of a second constant diameter.

An outer surface of the cap 160 may have a first portion 172 tapering way from an outer end of the cap 160 and a second longitudinal portion 174 of constant diameter. The second longitudinal portion 174 is substantially parallel to the second portion 166 of the bore 162.

A biasing member 180, here a spring, is mounted about the longitudinal member 130. A first end of the biasing member 180 abuts the abutment surface of the second sleeve and, in use, a second end of the biasing member 180 abuts the abutment surface 170 of the cap 160. The cap 160 is mounted over the longitudinal member 130. A stop member 190, here a washer secured to the free end of the longitudinal member 130, covers the free end the longitudinal member 130. It will be understood that the cap 130 is retained on the longitudinal member 130 by the stop 190 and is able to move longitudinally with respect to the longitudinal member 130 against the action of the biasing member 180, but due to the splines is prevented from rotating with respect to the longitudinal member 180 and so with respect to the lower drive shaft 80B.

The second longitudinal portion 174 of the outer surface of the cap 160 may have a plurality of wedge shaped radial projections 176, here three such projections (see FIG. 8). Each wedge 176 has a relatively fatter end 177 and a relatively narrower end 178. A lower surface 179 of each wedge 176 extends radially from the second end of the bore 160. Each relatively fatter end 177 has an abutment surface.

The first sleeve 140 may have a circumferential groove 148 to serve as an inner race for a ball race. The part of the tailings conveyor associated with the male fitting 120 may also include a plurality of bearing supports 194. Each bearing support 194, here three such supports, extends from an inner surface of the tailings conveyor to a circular member 196. An inner surface of the circular member 196 has a groove 198 forming an outer race of the ball race. In use, a plurality of ball bearings are within the ball race. It will be understood that as the lower shaft 80B rotates, the longitudinal member 130 is held circumferentially by the circular member 196 and is free to rotate within the circular member 196.

The female fitting 122 comprises a ring attached to an upper portion of the shaft 80A. The ring is shown in FIG. 9. The ring is of generally circular form having an internal diameter 200 and an external diameter 202. On one surface of the ring are provided a plurality of raised teeth 204, here three such teeth. Each tooth 204 has a longitudinally extending abutment surface 206 and a tapered portion 208 extending behind the abutment surface 206. In use, the ring is securely located at a free end the upper portion of the shaft 80A. The external diameter 202 conveniently corresponds to an inner diameter of the upper portion of the shaft 80A in order to allow the ring to be seated within the upper drive shaft 80A. An axially extending rim may conveniently be provided about a periphery of the outer diameter to provide a stop to prevent the ring being pushed too far into the upper drive shaft 80A.

When the upper tailings conveyor 72A is moved from the folded position, the male fitting 120 and the female fitting 122 are brought together. It will be understood that an outer surface of the ring, and in particular the abutment surfaces 206 of the raised teeth 204 will abut the wedges 176 of the cap 160. The cap 160 has some axial give in relation to the longitudinal member 130 due to the presence of the biasing means 180. The biasing means 180 also serve to bias the cap 160 towards the ring. In use, as the driven part of the shaft rotates the teeth of the ring and the fatter ends of the wedges 176 will meet one another, causing the upper and lower parts 80A, 80B of the shaft to rotate together as one.

It will be appreciated that the inclined surfaces of the ring teeth and the wedges may also act as a one way clutch to prevent reverse movement of the upper part 80A of the shaft.

In use, the upper part 72A of the tailings conveyor is secured to the lower part 72B of the tailings conveyor and the peripheral flange 84 of the ejection channel 82 is secured to the side wall 12. In order to obtain access to the region behind the tailings conveyor, the peripheral flange of the ejection channel 82 is released from the side wall 12 and the tether 116 moved away from the tailings conveyor to release the hoop 114. This allows the upper part 72A of the tailings conveyor to be folded back about the hinge pin arrangement 90 in relation to the lower part 72B of the tailings conveyor to a position substantially parallel to the lower part 72B of the tailings conveyor. When in this position, an operator or technician is more readily able to obtain access to the region of the combine behind the tailings conveyor for repair or maintenance.

Once a repair or maintenance has been completed, the upper part 72A of the tailings conveyor is pivoted in relation to the lower part 72B of the tailings conveyor about the hinge pin arrangement 90 until the upper part 72A of the tailings conveyor is once again aligned with the lower part 72B of the tailings conveyor. The upper part 72A of the tailings conveyor is then once again secured in position in relation to the lower part 72B of the tailings conveyor, for example by use of the clasp, and the peripheral flange 84 of the ejection channel 82 is once again secured to the side wall 12.

From reading the present disclosure, other modifications will be apparent to persons skilled in the art. Such modifications may involve other features which are already known in the field of combine harvesters and component parts therefore and which may be used instead of or in addition to features already described herein.

The invention claimed is:

1. A tailings return system in a combine harvester, the combine harvester comprising a frame having a side wall that extends generally parallel to a normal forward direction of travel, and the tailings return system comprising:
   a tailings conveyor mounted externally of the side wall and extending from a tailings collection channel to a tailings ejection channel, the tailings conveyor comprising:
      a lower part;
      an upper part; and
      a hinge that hingedly connects the upper part to the lower part.

2. The tailings return system of claim 1 wherein the lower part and the upper part are releasably securable in an aligned position in which both the upper part and the lower part extend parallel to the side wall.

3. The tailings return system of claim 2, wherein the lower part and the upper part each comprise an abutment.

4. The tailings return system of claim 3, wherein the abutment of each of the lower part and the upper part comprises a radially extending flange.

5. The tailings return system of claim 3, wherein the abutment of one of the lower part or the upper part comprises a circumferential groove and the abutment for the other of the lower part or the upper part comprises a peripheral tongue configured to be seated within the circumferential groove.

6. The tailings return system of claim 1, further comprising a screw conveyor and a drive shaft, wherein the lower part and the upper part together define a conveyance channel in which the drive shaft is configured to rotate the screw conveyor.

7. The tailings return system of claim 6, wherein the drive shaft comprises a lower drive shaft within the lower part and an upper drive shaft within the upper part, wherein one of the lower drive shaft or the upper drive shaft comprises a male fitting, and wherein the other of the lower drive shaft or the upper drive shaft comprises a female fitting.

8. The tailings return system of claim 7, wherein the male fitting comprises a frustoconical portion configured to seat within the female fitting.

9. The tailings return system of claim 7, wherein one of the male fitting or the female fitting comprises a radial projection and the other of the male fitting or the female fitting comprises an abutment surface.

10. The tailings (return system) of claim 7, wherein the male fitting comprises an adjustable cap configured to seat against the female fitting.

11. The tailings return system of claim 10, wherein the adjustable cap is configured to move axially with respect to the drive shaft.

12. The tailings return system of claim 11, further comprising a longitudinal member secured to the upper drive shaft or the lower drive shaft.

13. The tailings return system of claim 12, wherein the adjustable cap is mounted on the longitudinal member and configured to move axially with respect to the longitudinal member.

14. The tailings return system of claim 10, wherein the cap comprises a plurality of abutment surfaces and the female fitting comprises a plurality of abutment surfaces.

15. The tailings return system of claim 13, wherein a biasing member is located on the longitudinal member and in contact with the longitudinal member and the cap.

16. The tailings return system of claim 1, wherein the upper part defines an ejection channel having a peripheral flange.

* * * * *